(12) United States Patent
Schmidt et al.

(10) Patent No.: US 8,335,427 B1
(45) Date of Patent: Dec. 18, 2012

(54) CAMERA VIEWFINDER ACCESSORY MOUNT

(75) Inventors: Louis J. Schmidt, Hermosa Beach, CA (US); Michael R. Schmidt, Hermosa Beach, CA (US); Robert P. Schmidt, West Hollywood, CA (US)

(73) Assignee: Hoodman Corporation, Torrance, CA (US)

( * ) Notice: Subject to any disclaimer, the term of this patent is extended or adjusted under 35 U.S.C. 154(b) by 16 days.

(21) Appl. No.: 13/184,747

(22) Filed: Jul. 18, 2011

(51) Int. Cl.
G03B 11/00 (2006.01)
G03B 11/04 (2006.01)

(52) U.S. Cl. .................................. 396/534; 396/544

(58) Field of Classification Search .................. 396/544, 396/373, 382, 419, 422, 534; 359/600, 611, 359/507
See application file for complete search history.

(56) References Cited

U.S. PATENT DOCUMENTS

| 4,119,984 | A | * | 10/1978 | Zajac ............................. 396/373 |
| 4,576,459 | A | * | 3/1986 | Miura et al. .................. 396/534 |
| 6,144,810 | A | * | 11/2000 | Penkwitt et al. ............. 396/373 |
| 7,831,142 | B2 | * | 11/2010 | Schmidt ........................ 396/534 |
| 2008/0170843 | A1 | * | 7/2008 | Yamashita ....................... 396/25 |
| 2009/0169199 | A1 | * | 7/2009 | Takano ......................... 396/544 |

* cited by examiner

Primary Examiner — Christopher Mahoney
(74) Attorney, Agent, or Firm — Fildes & Outland, P.C.

(57) ABSTRACT

A camera viewfinder accessory mount in accordance with the invention includes a receiver mountable at least in part around a camera viewfinder frame. Thread units extend from the receiver. The thread units are defined by extensions having outside threads and inside geometric surfaces. A body portion of the accessory mount has a receiver end for matingly fitting the receiver, and a distal accessory end. The body portion further includes an indexing periphery having a peripheral shape for cooperating with the inside geometric surfaces of the thread units. The body portion also includes a stop radially extending from the periphery and spacedly disposed from the receiver end. A tightening wheel of the accessory mount has internal threads cooperable with the outside threads of the thread units to tighten the body portion receiver end to the camera viewfinder frame.

8 Claims, 4 Drawing Sheets

CAMERA VIEWFINDER ACCESSORY MOUNT

TECHNICAL FIELD

This invention relates to cameras having a viewfinder, and more particularly to a camera viewfinder accessory mount.

BACKGROUND OF THE INVENTION

It is known in the art relating to digital and film single reflex lens cameras having a viewfinder to utilize mounting rails or a similar attachment means on an outer portion of the viewfinder frame to mount various accessories to the camera viewfinder. Conventional accessory mounting devices include multiple parts that engage the mounting rails from the right or left hand side below the rails to lock the mounting device into place over the viewfinder. Alternatively, conventional accessory mounting devices lock into place over the viewfinder by locating and slipping into detents disposed midway in the rail channel. Also, some conventional accessory mounting devices do not lock into place. These conventional accessory mounting devices all have the problem that they tend to insecurely mount to a camera and often fall off the camera.

SUMMARY OF THE INVENTION

The present invention provides a camera viewfinder accessory mount that easily clamps a viewfinder accessory tightly and securely against the frame or other portion of a camera viewfinder. The mount can be used to mount a variety of different accessories to the camera viewfinder and is not limited to any particular viewfinder accessory. Further, since the present accessory mount is more securely connectable to a camera, larger accessories (i.e., heavier and more bulky accessories) can be safely and securely mounted on the viewfinder with less risk that the accessories will fall off the camera.

More particularly, a camera viewfinder accessory mount in accordance with the invention includes a receiver mountable at least in part around a camera viewfinder frame. Thread units extend from the receiver. The thread units are defined by extensions having outside threads and inside geometric surfaces. A body portion of the accessory mount has a receiver end for matingly fitting the receiver, and a distal accessory end. The body portion further includes an indexing periphery having a peripheral shape for cooperating with the inside geometric surfaces of the thread units. The body portion also includes a stop radially extending from the periphery and spacedly disposed from the receiver end. A tightening wheel of the accessory mount has internal threads cooperable with the outside threads of the thread units to tighten the body portion receiver end to the camera viewfinder frame.

The receiver may include a generally U-shaped groove. The stop may be disposed at corners of the body portion. The body portion may include guides that support the thread units. The body portion may be fixedly connected to a camera viewfinder accessory. The body portion may include a lens therein. The tightening wheel may have a contoured outer gripping surface.

A method of mounting a camera viewfinder accessory on a camera having a viewfinder surrounded by a frame includes providing a camera viewfinder accessory mount including a receiver mountable at least in part around the camera viewfinder frame, thread units extending from the receiver, the thread units being defined by extensions having outside threads and inside geometric surfaces, a body portion having a receiver end for matingly fitting the receiver, and a distal accessory end, the body portion having an indexing periphery having a peripheral shape for cooperating with the inside geometric surfaces of the thread units, the body portion also including a stop radially extending from the periphery and spacedly disposed from the receiver end, and a tightening wheel having internal threads cooperable with the outside threads of the thread units; sliding a U-shaped groove of the receiver over the viewfinder frame; connecting the body portion to the camera viewfinder accessory; inserting the thread units into the indexing periphery of the body portion; engaging the internal threads of the tightening wheel with the outside threads of the thread units; and rotating the tightening wheel, causing the receiver to be drawn towards the body portion and urging the viewfinder frame against the body portion receiver end.

These and other features and advantages of the invention will be more fully understood from the following detailed description of the invention taken together with the accompanying drawings.

DETAILED DESCRIPTION OF THE INVENTION

Figure 1:
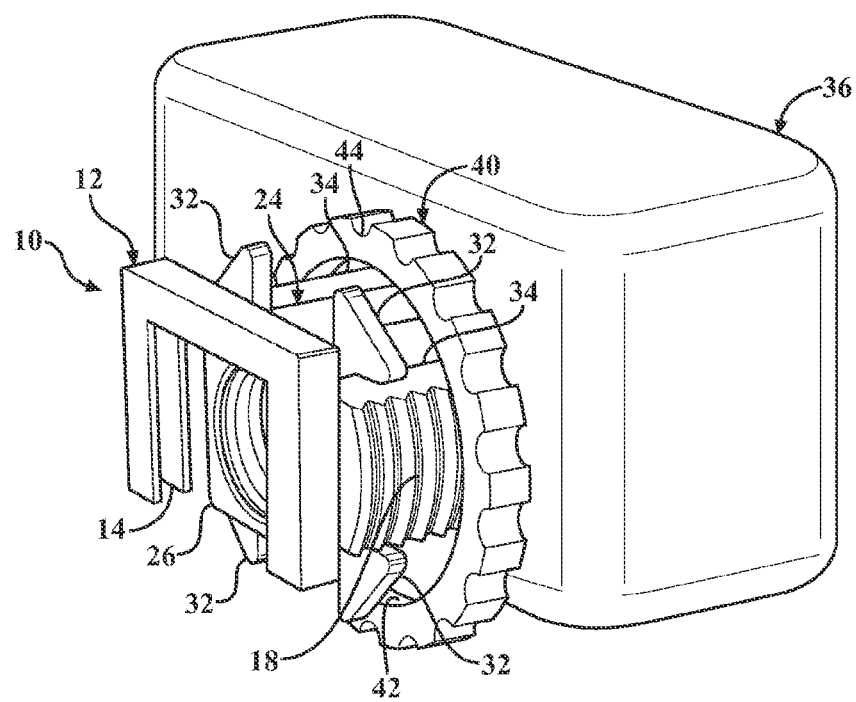
FIG. 1 is a perspective view of a camera viewfinder accessory mount in accordance with the invention.
Figure 2:
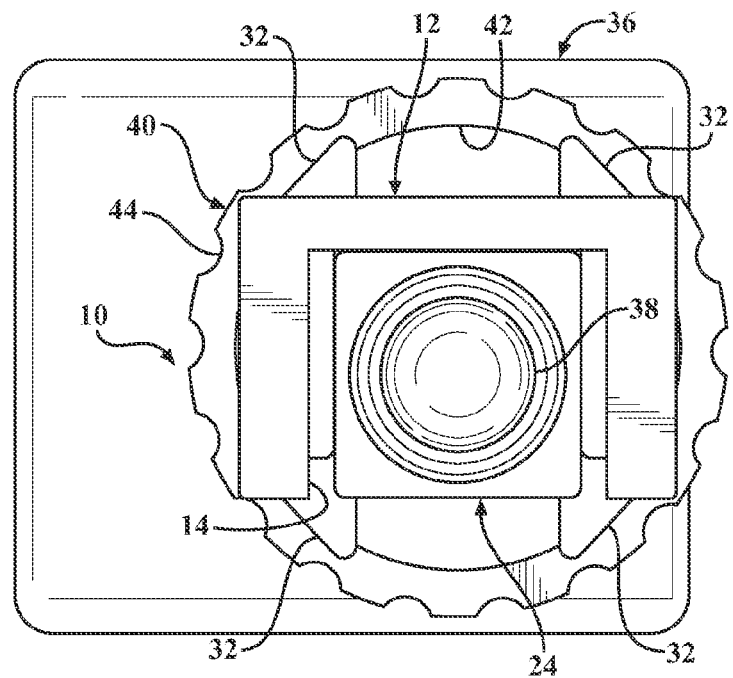
FIG. 2 is a front view of the camera viewfinder accessory mount.

Referring now to the drawings in detail, numeral 10 generally indicates a camera viewfinder accessory mount in accordance with the invention. The accessory mount 10 can be used to easily and securely mount and dismount viewfinder accessories such as eyecups, hoods, right-angle viewers, adjustable viewers, and the like on a camera.

With reference to FIGS. 1 through 5, the camera viewfinder accessory mount 10 includes a receiver 12 that is mountable at least in part around a frame of an optical or electronic viewfinder of a camera. The receiver 12 may include a generally U-shaped groove 14. The receiver 12 can be mounted onto the viewfinder frame by sliding the open end of the U-shaped groove 14 over outer peripheral edges of the viewfinder frame, preferably from the upper side of the frame. The edges of the viewfinder frame fit into the groove 14.

Two thread units 16 extend from opposite sides of the receiver 12. The thread units 16 are defined by extensions having outside threads 18 and inside geometric surfaces 20. The outside threads 18 generally cover the entire outer surface of the thread units 16, and the outer surface of the thread units may be generally arcuate in shape in a direction parallel to the threads so that the threads can smoothly cooperate with a threaded inner ring-shaped surface as described in more detail below. The geometric surfaces 20 may be generally flat (planar), but are not limited to any particular geometry and shape as long as the surfaces 20 are continuous (constant) in a longitudinal direction. Each thread unit 16 also has a pair of parallel, opposite edges 22.

The accessory mount 10 further includes a body portion 24 having a receiver end 26 for matingly fitting the receiver 12 on the body portion. The body portion 24 also has a distal accessory end 28 that is opposite the receiver end 26. The body portion 24 further includes an indexing periphery 30 having a peripheral shape for cooperating with the inside geometric surfaces 20 of the thread units 16. The body portion 24 also includes a stop 32 radially extending from the periphery 30 and spacedly disposed from the receiver end 26, i.e. the stop 32 is disposed inward from the end 26 of the body portion. The stop 32 may be disposed at corners of the body portion 24. For example, if the body portion 24 has a generally square cross-section, the stop 32 may be defined by radial extensions at each of the four corners of the square-shaped cross-section. The body portion also may include guides 34 that support the thread units 16. The guides 34 may be longitudinally disposed raised surfaces along the indexing periphery and thus define the indices of the indexing periphery 30.

The body portion 24 may be fixedly connected to a camera viewfinder accessory 36. The body portion 24 then may include a lens 38 therein that receives light from an external source (such as a camera viewfinder on which the mount 10 is attached) and transmits the light to the internal optics of the camera viewfinder accessory.

The accessory mount 10 further includes a tightening wheel 40 having internal threads 42 cooperable with the outside threads 18 of the thread units 16 to tighten the body portion receiver end 26 to the camera viewfinder frame. The tightening wheel 40 encircles the body portion 24 and is prevented from being freed from the body portion by the stop 32. The tightening wheel 40 may have a contoured outer gripping surface 44 such as alternating ridges and grooves. When the inner threads 42 of the tightening wheel are engaged with the outside threads 18 of the thread units 16, rotation of the tightening wheel 40 draws the receiver 12 towards the stop 32 of the body portion 24.

Figure 3:
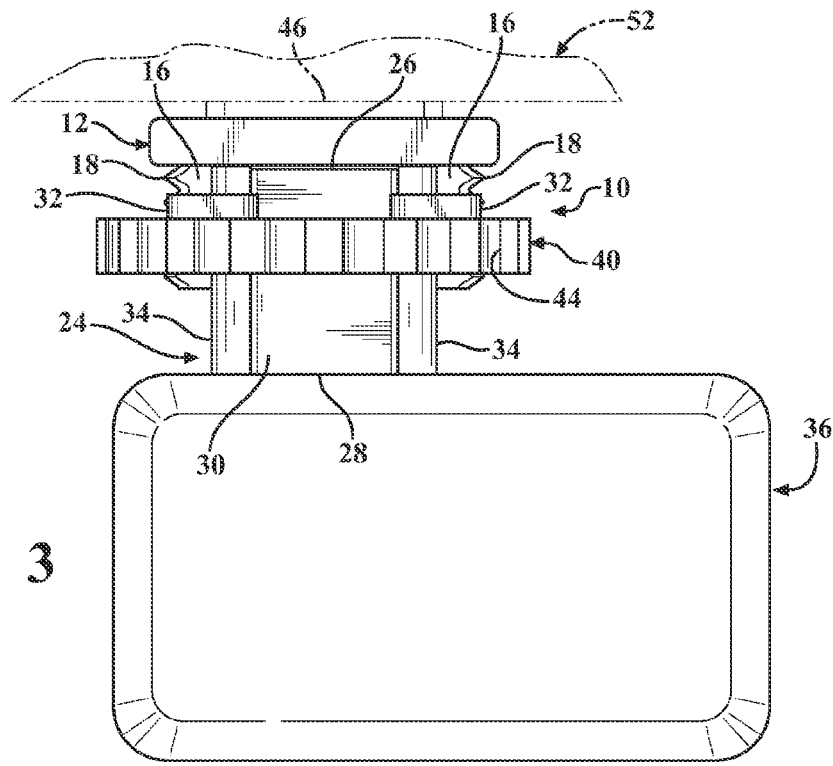
FIG. 3 is a plan view of the camera viewfinder accessory mount.
Figure 4:
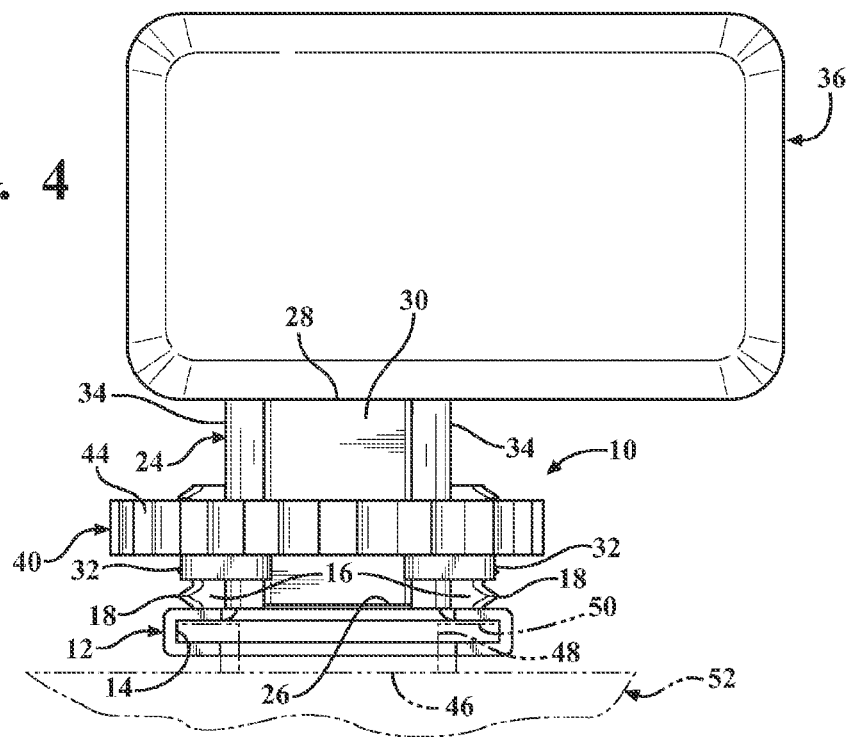
FIG. 4 is a bottom view of the camera viewfinder accessory mount.
Figure 5:
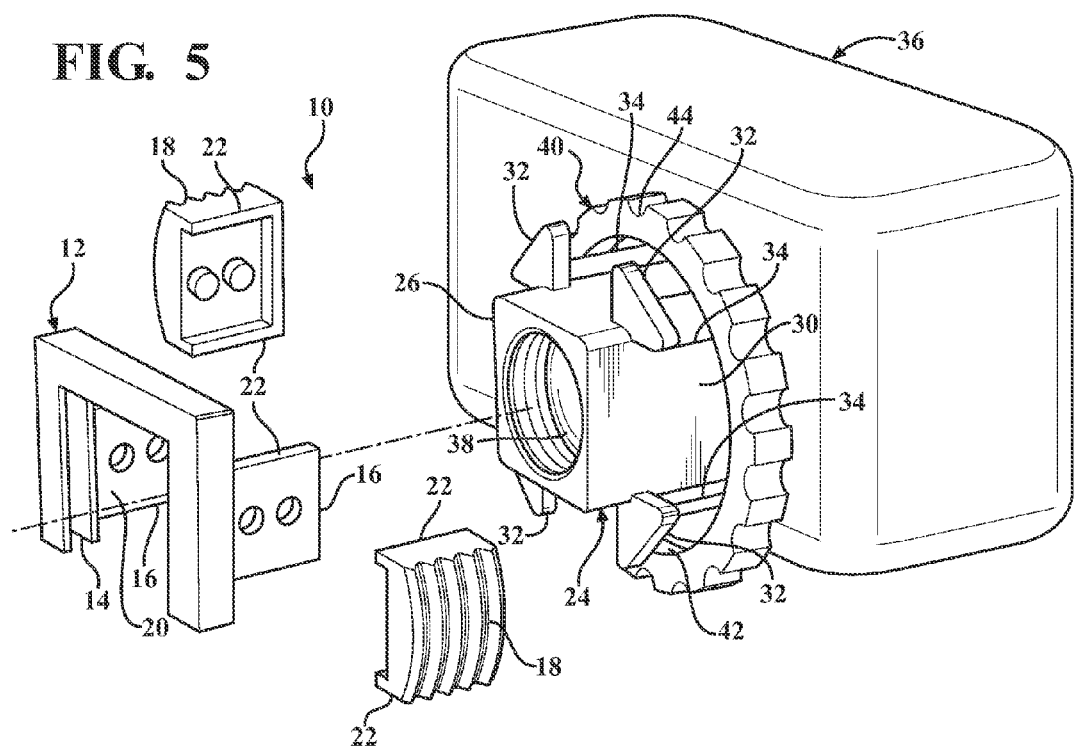
FIG. 5 is a partially exploded view of the camera viewfinder accessory mount.
Figure 6:
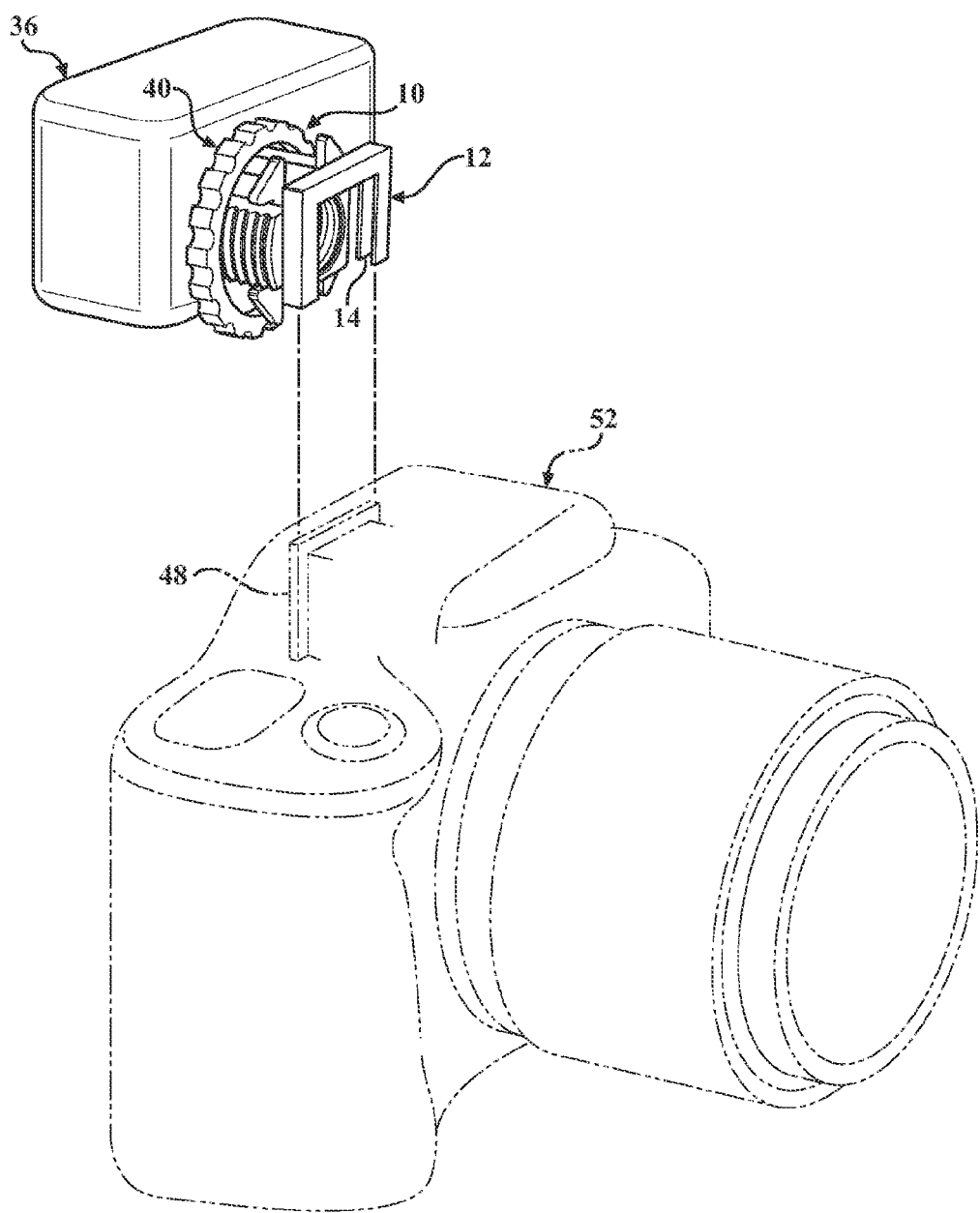
FIG. 6 is an exploded view of the camera viewfinder accessory mount mounting a camera viewfinder accessory to a camera viewfinder.

As shown in FIGS. 3, 4, and 6, to mount a camera viewfinder accessory 36 to a camera viewfinder 46, the tightening wheel 40 is loosened so that the receiver 12 can be slid away from the body portion 24. In this disposition, the open end of the U-shaped slot is clear of the body portion 24. The accessory mount 10 and connected accessory 36 is then slid over the camera viewfinder frame 48 (preferably from the upper side of the frame) such that the outer peripheral edges 50 of the viewfinder frame fit into the U-shaped groove 14 of the receiver 12. In this description, the base of the camera 52 is considered to be the "bottom" of the camera and the "top" of the camera is opposite the base, regardless of whether the camera 52 is actually in an upright position with the base resting on a horizontal surface. With the accessory mount 10 positioned above the viewfinder frame 48, the user manipulates the accessory mount 10 in a downward direction relative to the viewfinder frame. As the mount 10 moves downward, the viewfinder frame 48 is slid into the U-shaped groove 14. Once the viewfinder frame 48 is completely received in the receiver 12, the user can grip the tightening wheel 40 with a thumb and forefinger and rotate the tightening wheel. Rotation of the tightening wheel 40 draws the receiver 12 towards the body portion 24 by urging the thread units 16 along the indexing periphery 30. Due to the cooperative geometry of the geometric surfaces 20 of the thread units 16 and the indexing periphery 30, the thread units 16 smoothly slid along the surfaces of the indexing periphery 30. As the receiver 12 approaches the body portion 24, the viewfinder frame 48 is drawn against the surface of the receiver end 26 of the body portion 24. When the tightening wheel 40 is completely tightened and will not turn any further, the tightening wheel presses against the stop 32 and the viewfinder frame 48 is urged against the receiver end 26 of the body portion 24. The viewfinder accessory 36 is thus securely mounted on the camera viewfinder 46. To remove the viewfinder accessory 36 from the camera 52, the above steps are performed in reverse order. The viewfinder accessory 36 also can be rotated 90° by "unscrewing" the tightening wheel 40, sliding the receiver 12 away from the body portion 24, rotating the receiver 90°, reinserting the receiver along the other two surfaces of the indexing periphery 30 separated by the guides 34 (i.e., the "upper" and "lower" surfaces of the indexing periphery 30 rather than the two "lateral" surfaces of the indexing periphery 30 along which the receiver 12 is positioned as shown in FIG. 6), and screwing the tightening wheel 40 to the threads 18.

In an alternative embodiment, the camera viewfinder may not include mounting rails as an attachment means. For example, the camera viewfinder may include a slot, groove, or track. In this case, the receiver 12 of the accessory mount 10 may include, instead of the U-shaped groove 14, inwardly facing protrusions that are cooperable with the slot, groove, or track of the camera viewfinder. Thus, the receiver 12 only needs to have a structural feature that is cooperable with the structure of the attachment means of the camera viewfinder.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A camera viewfinder accessory mount comprising:
   a receiver mountable at least in part around a camera viewfinder frame;
   thread units extending from said receiver;
   said thread units being defined by extensions having outside threads and inside geometric surfaces;
   a body portion having a receiver end for matingly fitting said receiver, and a distal accessory end;
   said body portion having an indexing periphery having a peripheral shape for cooperating with said inside geometric surfaces of said thread units;
   said body portion also including a stop radially extending from said periphery and spacedly disposed from said receiver end; and
   a tightening wheel having internal threads cooperable with said outside threads of said thread units to tighten said body portion receiver end to the camera viewfinder frame.

2. The camera viewfinder accessory mount of claim 1, wherein said receiver includes a generally U-shaped groove.

3. The camera viewfinder accessory mount of claim 1, wherein said stop is disposed at corners of said body portion.

4. The camera viewfinder accessory mount of claim 1, wherein said body portion includes guides that support said thread units.

5. The camera viewfinder accessory mount of claim 1, wherein said body portion is fixedly connected to a camera viewfinder accessory.

6. The camera viewfinder accessory mount of claim 1, wherein said body portion includes a lens therein.

7. The camera viewfinder accessory mount of claim 1, wherein said tightening wheel has a contoured outer gripping surface.

8. A method of mounting a camera viewfinder accessory on a camera having a viewfinder surrounded by a frame, the method comprising the steps of:

provinding a camera viewfinder accessory mount including a receiver mountable at least in part around the camera viewfinder frame, thread units extending from said receiver, said thread units being defined by extensions having outside threads and inside geometric surfaces, a body portion having a receiver end for matingly fitting said receiver, and a distal accessory end, said body portion having an indexing periphery having a peripheral shape for cooperating with said inside geometric surfaces of said thread units, said body portion also including a stop radially extending from said periphery and spacedly disposed from said receiver end, and a tightening wheel having internal threads cooperable with said outside threads of said thread units;

sliding a U-shaped groove of said receiver over the viewfinder frame;

connecting said body portion to the camera viewfinder accessory;

inserting said thread units into said indexing periphery of said body portion;

engaging said internal threads of said tightening wheel with said outside threads of said thread units; and rotating said tightening wheel, causing said receiver to be drawn towards said body portion and urging the viewfinder frame against said body portion receiver end.

* * * * *